United States Patent
Mathane et al.

(10) Patent No.: US 11,102,002 B2
(45) Date of Patent: Aug. 24, 2021

(54) TRUST DOMAIN ISOLATION MANAGEMENT IN SECURED EXECUTION ENVIRONMENTS

(71) Applicant: Dell Products, L.P., Round Rock, TX (US)

(72) Inventors: Sudhir Mathane, Leander, TX (US); Ricardo L. Martinez, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 328 days.

(21) Appl. No.: 16/236,251

(22) Filed: Dec. 28, 2018

(65) Prior Publication Data
US 2020/0213115 A1 Jul. 2, 2020

(51) Int. Cl.
*H04L 9/32* (2006.01)
*H04L 9/14* (2006.01)

(52) U.S. Cl.
CPC ............. *H04L 9/3213* (2013.01); *H04L 9/14* (2013.01)

(58) Field of Classification Search
CPC ....... H04L 9/3213; H04L 9/14; H04L 9/3247; G06F 21/575
USPC .......................................................... 713/189
See application file for complete search history.

(56) References Cited

U.S. PATENT DOCUMENTS

| | | | | |
|---|---|---|---|---|
| 7,937,757 B2 * | 5/2011 | Focke | .................. | G06F 21/6218 726/22 |
| 8,971,535 B2 * | 3/2015 | Reilly | ................... | H04L 9/0894 380/277 |
| 9,286,465 B1 * | 3/2016 | Jain | .......................... | H04L 63/10 |
| 9,363,676 B2 * | 6/2016 | Guccione | ............ | G06F 21/6218 |
| 9,866,392 B1 * | 1/2018 | Campagna | ................ | H04L 9/14 |
| 10,389,688 B2 * | 8/2019 | Hatcher | ................ | H04L 9/0643 |
| 2003/0120948 A1 * | 6/2003 | Schmidt | ................ | H04L 63/083 726/8 |
| 2005/0213763 A1 * | 9/2005 | Owen | ...................... | H04L 63/12 380/270 |
| 2009/0031131 A1 * | 1/2009 | Qiu | .......................... | H04L 9/006 713/172 |
| 2009/0249064 A1 * | 10/2009 | De Atley | ................. | G06F 21/51 713/164 |
| 2009/0249065 A1 * | 10/2009 | De Atley | ................. | G06F 21/51 713/164 |
| 2009/0254753 A1 * | 10/2009 | De Atley | ................. | G06F 21/51 713/176 |

(Continued)

*Primary Examiner* — Badri Narayanan Champakesan
(74) *Attorney, Agent, or Firm* — Fogarty LLP

(57) ABSTRACT

An established root of trust supports a secure execution environment (SEE) that supports execution of validated software instructions on behalf of trust domains that operate within the SEE to implement functions and to support hardware supported by the IHS. Embodiments support isolated operation of such trust domains within the SEE while avoiding the overhead of isolation within separate software environment enclaves. Signed instructions for the operation of a trust domain are retrieved and authenticated based on a signing token associated with the trust domain. If authenticated, the trust domain is granted access to resources set forth in a privilege policy token linked to the signing token of the trust domain. The privileges assigned to a trust domain may be modified by linking the trust domain's signing token to a new privilege policy token.

17 Claims, 3 Drawing Sheets

(56) References Cited

U.S. PATENT DOCUMENTS

| | | | |
|---|---|---|---|
| 2010/0082991 A1* | 4/2010 | Baldwin | H04L 9/083 713/176 |
| 2010/0175119 A1* | 7/2010 | Vitaletti | H04L 9/3226 726/9 |
| 2012/0096272 A1* | 4/2012 | Jasper | H04L 63/0853 713/176 |
| 2013/0061056 A1* | 3/2013 | Proudler | G06F 21/57 713/176 |
| 2013/0318570 A1* | 11/2013 | L. | H04L 63/00 726/4 |
| 2014/0164776 A1* | 6/2014 | Hook | G06F 21/6218 713/171 |
| 2014/0179271 A1* | 6/2014 | Guccione | G06F 21/6218 455/410 |
| 2015/0237041 A1* | 8/2015 | Flamini | H04L 63/0815 726/10 |
| 2016/0277447 A1* | 9/2016 | Pope | H04L 63/0227 |
| 2017/0011396 A1* | 1/2017 | Desai | G06Q 30/06 |
| 2017/0048714 A1* | 2/2017 | Attfield | G06F 21/57 |
| 2018/0097809 A1* | 4/2018 | Chakrabarti | H04L 63/10 |
| 2018/0270068 A1* | 9/2018 | Innis | G06F 21/64 |
| 2018/0373885 A1* | 12/2018 | Arad | G06F 21/629 |
| 2019/0140846 A1* | 5/2019 | Moore | H04L 9/3265 |
| 2019/0319843 A1* | 10/2019 | Telfer | H04L 67/025 |

* cited by examiner

TRUST DOMAIN ISOLATION MANAGEMENT IN SECURED EXECUTION ENVIRONMENTS

FIELD

The present disclosure generally relates to Information Handling Systems (IHSs), and, more particularly, to systems and methods for securely initializing and operating IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and components may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

During initialization of an IHS, a root of trust may be established in a hardware component of the IHS by validating the integrity of the instructions, such as firmware, utilized by the hardware component. A trusted hardware component may then serve as an anchor that may be used to validate the integrity of additional hardware components of the IHS, thus extending the scope of the trusted hardware of the IHS. In this manner, an IHS may be initialized only after the integrity of a requisite set of hardware components has been validated. The trusted hardware of an IHS may then be used to operate a secure execution environment.

Software applications from multiple unrelated entities may operate within a single secure execution environment. Unrelated entities may prefer to maintain isolated operations from the other entities operating within a secure execution environment. In particular, unrelated entities may prefer for certain sensitive data to remain inaccessible to other entities operating within the same secure execution environment. In addition, unrelated entities with highly variable data security preferences may operate concurrently in a secure execution environment.

SUMMARY

In various embodiments, methods provide isolation of trust domains within a secure execution environment of a trusted component of an Information Handling System (IHS). The methods include: retrieving a plurality of signing tokens from a memory device of the IHS, wherein each signing token comprises a signing key and comprises a link to a privilege policy token, and wherein each signing key is associated with a trust domain; retrieving a plurality of privilege policy tokens from the memory device, wherein each privilege policy token specifies a plurality of resources of the IHS; retrieving, from the memory device, first signed instructions for the operation of a first trust domain; validating the signature of the first signed instructions based on a first signing key associated with the first trust domain; and if the first signed instructions are validated, granting the first trust domain access to a first plurality of IHS resources specified by a first privilege policy token that is linked to the signing token of the first signing key.

Additional method embodiments include: linking a second privilege policy token to the first signing key; and granting the first trust domain access to a second plurality of IHS resources specified by the second privilege policy token. In additional method embodiments, the first plurality of resources comprises a first region of a system memory of the IHS. Additional method embodiments include denying requests to access the first region of system memory if the requests cannot be validated using the first signing key. In additional method embodiments, the first privilege policy token is linked to the first signing key by a reference to the first privilege policy token in metadata of the first signing token. In additional method embodiments, the plurality of privilege policy tokens retrieved from the memory device are signed by a signing authority, and wherein the plurality of retrieved signing keys are signed by the signing authority. Additional method embodiments include validating the signature of the plurality of privilege policy tokens and the signature of the plurality of retrieved signing keys using a root key associated with the signing authority. In additional method embodiments, the trusted component is an embedded controller.

In various additional embodiments, an Information Handling System (IHS) includes: a flash memory; and an embedded controller coupled to the flash memory, wherein the embedded controller is configured to: retrieve a plurality of signing tokens from the flash memory, wherein each signing token comprises a signing key and comprises a link to a privilege policy token, and wherein each signing key is associated with a trust domain; retrieve a plurality of privilege policy tokens from the flash memory, wherein each privilege policy token specifies a plurality of resources of the IHS; retrieve, from the flash memory, first signed instructions for the operation of a first trust domain; validate the signature of the first signed instructions based on a first signing key associated with the first trust domain; and if the first signed instructions are validated, grant the first trust domain access to a first plurality of IHS resources specified by a first privilege policy token that is linked to the signing token of the first signing key.

In additional IHS embodiments, a second privilege policy token is linked to the first signing key, and wherein the embedded controller is further configured to grant the first trust domain access to a second plurality of IHS resources specified by the second privilege policy token. In additional IHS embodiments, the first plurality of resources comprises a first region of a system memory of the IHS. In additional IHS embodiments, the embedded controller is further configured to deny requests to access the first region of system memory if the requests cannot be validated using the first signing key. In additional IHS embodiments, the first privilege policy token is linked to the first signing key by a reference to the first privilege policy token in metadata of the first signing token. In additional IHS embodiments, the embedded controller is configured to validate a signature of the plurality of privilege policy tokens and a signature of the plurality of retrieved signing keys using a root key associated with a signing authority.

In various additional embodiments, an embedded controller is coupled to a flash memory of an Information Handling System (IHS) and the embedded controller is configured to: retrieve a plurality of signing tokens from the flash memory of the IHS, wherein each signing token comprises a signing key and comprises a link to a privilege policy token, and wherein each signing key is associated with a trust domain; retrieve a plurality of privilege policy tokens from the flash memory, wherein each privilege policy token specifies a plurality of resources of the IHS; retrieve, from the flash memory, first signed instructions for the operation of a first trust domain; validate the signature of the first signed instructions based on a first signing key associated with the first trust domain; and if the first signed instructions are validated, grant the first trust domain access to a first plurality of IHS resources specified by a first privilege policy token that is linked to the signing token of the first signing key.

In additional embedded controller embodiments, a second privilege policy token is linked to the first signing key, and wherein the embedded controller is further configured to grant the first trust domain access to a second plurality of IHS resources specified by the second privilege policy token. In additional embedded controller embodiments, the first plurality of resources comprises a first region of a system memory of the IHS. In additional embodiments, the embedded controller is further configured to deny requests to access the first region of system memory if the requests cannot be validated using the first signing key. In additional embedded controller embodiments, the first privilege policy token is linked to the first signing key by a reference to the first privilege policy token in metadata of the first signing token. In additional embedded controller embodiments, the embedded controller is configured to validate a signature of the plurality of privilege policy tokens and a signature of the plurality of retrieved signing keys using a root key associated with a signing authority.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

A hardware root of trust in an IHS may include one or more hardware components that operate using validated hardware instructions, thus providing assurances regarding the integrity of the hardware and software operating within the root of trust. Once a root of trust has been established, the root of trust may be extended by validating additional components and the instructions by which these components operate, thus allowing for secure delegation to validated components. In certain embodiments, an established root of trust may be used to support a secure execution environment that supports execution of validated software instructions on behalf of trust domains that may correspond to trusted applications and/or trusted hardware components.

Components and applications that have been validated to operate under the management of an established root of trust may constitute trust domains that operate within the secure execution environment to implement various functions supported by the IHS. For instance, within a secure execution environment, a trust domain may implement specific functions such as digital rights management, digital payments or device management. A trust domain may instead support a hardware component, such as keyboard or battery. Embodiments provide the capability to support isolated operation of such trust domains within the secure execution environment while avoiding the significant overhead required to provide each trust domain with a separate software environment enclave, such as a virtual machine, hypervisor, container and the like.

Figure 1:
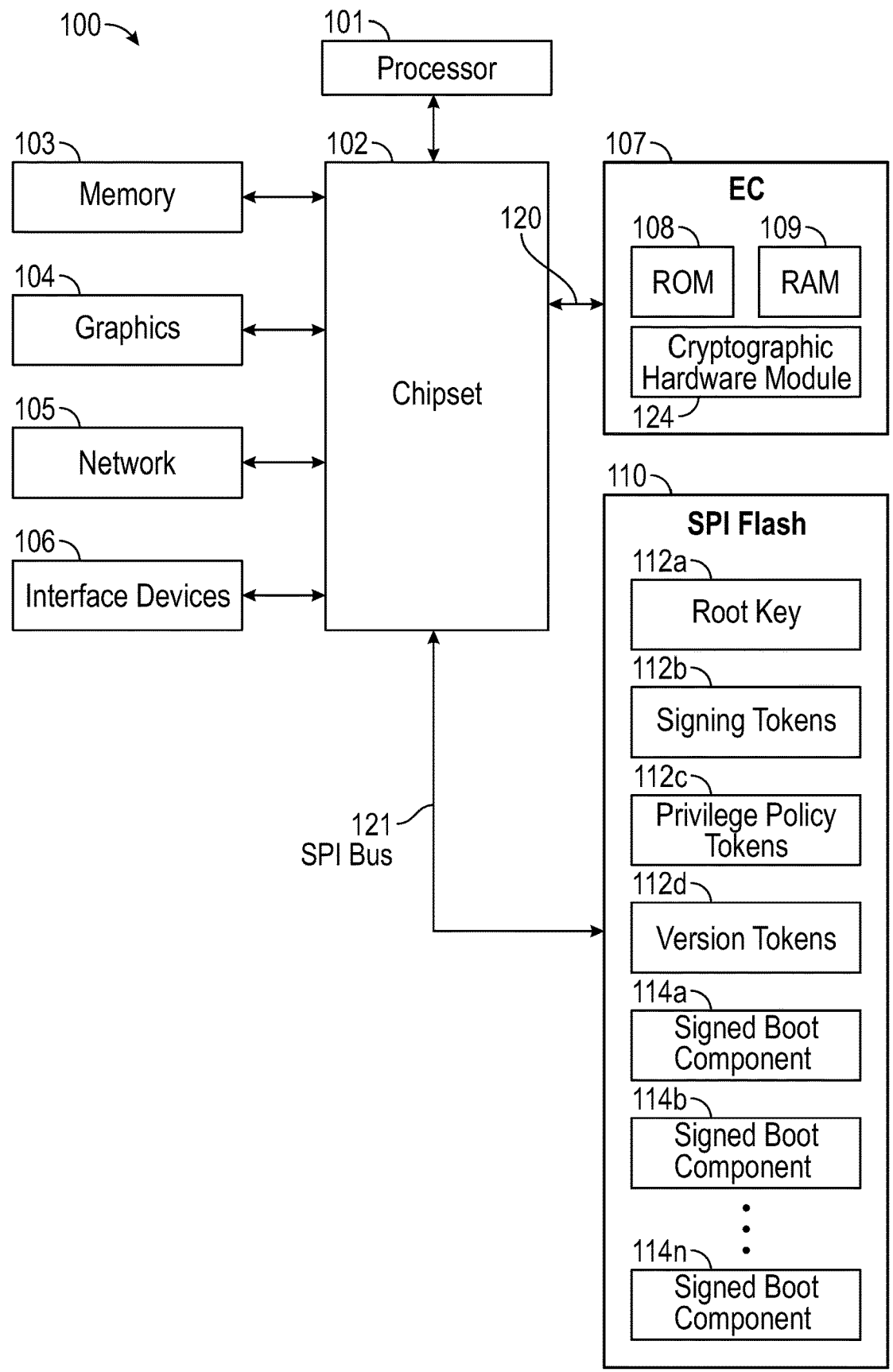
FIG. 1 is a block diagram illustrating certain components of an Information Handling System (IHS) configured, according to some embodiments, for providing isolation of trust domains within a secure execution environment.

FIG. 1 illustrates an example of components of IHS 100 configured, according to some embodiments, for providing isolation of trust domains within a secure execution environment. As illustrated, IHS 100 includes a main processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes Platform Controller Hub (PCH) or chipset 102, which may comprise one or more integrated circuits (ICs) coupled to processor 101. In certain embodiments, chipset 102 may utilize a QuickPath Interconnect (QPI) bus to communicate with processor 101. Chipset 102 provides processor 101 with access to a variety of resources. For instance, chipset 102 may provide access to graphics processor 104. In certain embodiments, graphics processor 104 may be part of one or more video or graphics cards installed as components of IHS 100. Graphics processor 104 may be coupled to chipset 102 via a graphics bus such as provided by an AGP (Accelerated Graphics Port) bus or a PCIe (Peripheral Component Interconnect Express) bus. In certain embodiments, a graphics processor 104 generates display signals and provides them to a monitor or other display device.

As illustrated, chipset 102 may be coupled to a network interface 105, such as an interface provided by a Network Interface Controller (NIC). In certain embodiments, network interface 105 may be coupled to chipset 102 via a PCIe bus and may support communications via various wired and/or wireless networks. User interface device(s) 106 may include a keyboard, trackpad, touchscreen controller, microphone, camera, remote control, or any other device configured to enable a human user to interact with IHS 100.

Chipset 102 may also provide access to a system memory 103. System memory 103 may be configured to store program instructions and/or data accessible by processor 101. In various embodiments, system memory may be comprised of multiple removable memory modules. Such removable system memory 103 may correspond to a printed circuit board memory socket that receives a removable memory module, such as a DIMM (Dual In-line Memory Module), that can be coupled to the socket and then decoupled from the socket as needed, such as to upgrade memory capabilities or to replace faulty components. Other embodiments of IHS system memory 103 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

As illustrated, IHS 100 includes an embedded controller (EC) 107 that may be a microcontroller installed on the motherboard of IHS 100, or that may be installed on an expansion card that is coupled to the IHS 100 motherboard. In certain embodiments, embedded controller 107 may be configured to authenticate its own firmware instructions using hard-coded, immutable instructions, such as instructions encoded within a ROM 108, in order to establish a hardware root of trust in the embedded controller 107. As described in additional detail with regard to FIG. 2, the instructions encoded in ROM 108 may validate the firmware instructions of the embedded controller using cryptographic information encoded within an immutable memory of the embedded controller 107, such as cryptographic keys encoded within one-time programmable registers. As described in additional detail with regard to FIG. 2, in certain embodiments, embedded controller 107 may extend the root of trust by authenticating trust domains that perform various system tasks that are not implemented by the IHS's Operating System (OS), such as receiving and processing signals from attached peripherals, turning the IHS on and off, thermal measurement and cooling, controlling visual indicators utilized by the IHS, battery and power management, and supported remote diagnostics and management of the IHS.

As illustrated, embedded controller 107 may also include a cryptographic hardware module 124. Cryptographic hardware module 124 may implement various cryptographic operations and may be relied on as a trusted authentication resource that is not corruptible without physical access to the embedded controller. In certain embodiments, cryptographic hardware module 124 may include read-only storage that may be used to record various cryptographic keys and/or signatures. In certain embodiments, the read-only storage utilized by cryptographic hardware module 124 may be one-time programmable registers, such as a fuse bank in which cryptographic keys may be permanently encoded.

Once encode in this manner, modification of such cryptographic keys and signatures may be extremely difficult without damaging the cryptographic hardware module 124 and/or the embedded controller 107. In various embodiments, cryptographic hardware module 124 may be implemented as a system-on-chip, an FPGA, or as other hardware logic integrated into embedded controller 107.

As illustrated, embedded controller 107 may also include two types of internal memories, a non-volatile (Read-Only Memory) ROM 108 and a volatile (Random-Access Memory) RAM 109. In certain embodiments, the ROM 108 may be programmed with instructions that initiate establishing a hardware root of trust in embedded controller 107. In certain of such embodiments, the ROM 108 instructions may direct the retrieval and authentication of firmware instructions to be utilized by the embedded controller 107. For instance, the ROM 108 instructions may read firmware instructions from a SPI (Serial Peripheral Interface) Flash 110 memory module of the IHS 100. The firmware instructions of the embedded controller 107 may be transferred to the RAM 109 for authentication, in certain instances using cryptographic information stored in one-time programmable registers or other immutable storage capabilities accessible to the cryptographic hardware module 124.

In certain embodiments, SPI Flash 110 may be a non-volatile memory device capable of being electrically erased and reprogrammed. In certain embodiments, SPI flash 110 may be coupled to the chipset 102 of IHS over an SPI bus 121 that supports transfers of contiguous blocks of data from SPI Flash 110. SPI Flash 110 may be divided into various region 112a-d, 114a-n, with each region storing different types of instructions and/or data for components of IHS 100. SPI Flash 110 may also include various other types of regions and/or partitions in addition to the regions 112a-d, 114a-n illustrated in FIG. 1. In certain embodiments, some of the regions 112a-d, 114a-n may be provisioned during trusted manufacture of IHS 100. For instance, regions 112a-d may be provisioned with cryptographic keys and tokens used to identify and isolate operations by trust domains without requiring separate software enclave execution spaces for each of the trust domains.

As illustrated, region 112a of SPI Flash 110 may store a root key that is generated during manufacture of IHS 100 and that is a unique cryptographic key specific to IHS 100. As described in addition detail with regard to FIG. 2, the root key of region 112a may be retrieved from SPI Flash 110 and encoded within one-time programmable registers of a trusted component, such as a programmable fuse bank accessible by the embedded controller 107. In certain embodiments, root key may be programmed into a fuse back without being stored within SPI Flash 110, such as during a trusted manufacture process of IHS 100 by which a signing authority provides a root key that is programmed directly into the fuse block. As described in additional detail with regard to FIG. 3, the root key of region 112a that is encoded by the trusted component may be associated with a signing authority and used to validate the authenticity of the information used by the trusted component in providing isolated operations to one or more trust domains.

Region 112b of SPI Flash 110 may store one or more signing tokens. The signing tokens of region 112b may be populated during the trusted manufacturing process, or via trusted administration of IHS 100. In certain embodiments, regions 112b may store an indexed array of signing tokens, where each individual signing token includes metadata that identifies a trust domain that has been authorized for operation within a secure execution environment of IHS 100. The signing token for each trust domain may also include a unique, cryptographic signing key associated with the trust domain. As described in additional detail with regard to FIG. 3, the signing keys of region 112*b* may be utilized to authenticate instructions and operations by a trust domain within a secure execution environment. In certain embodiments, the metadata of each signing token of region 112*b* may designate secure execution environment privileges that have been granted to the trust domain. Through modifications to such metadata designations, the privileges granted to a trust domain may be modified while maintaining use of the same signing key by the trust domain and without requiring any modifications by the trust domain. In certain embodiments, the contents of region 112*b* may be signed using the cryptographic key of the signing authority, such as root token 112*a*, during the trusted manufacture of IHS 100.

Region 112*c* of SPI Flash 110 may store one or more privilege policy tokens that specify unique sets of privileges within a secure execution environment. Like the signing tokens, the privilege policy tokens of region 112*c* may be populated during the trusted manufacturing process, or via trusted administration of IHS 100. In certain embodiments, individual privilege policy tokens of region 112*c* may be linked to a specific trust domain based on a designation that is specified in the metadata of the signing token 112*c* associated with the trust domain. For instance, the metadata of a signing token stored in 112*c* may include an index that corresponds to the index of a privilege policy token that is stored within an indexed list of privilege policy tokens stored in region 112*c*. As described in additional detail with regard to FIG. 2, each individual privilege policy token of region 112*c* may be specify a set of resources and capabilities of secure execution environment of IHS 100 for which access is being granted to a trust domain. In certain embodiments, the contents of region 112*c* may be signed using the cryptographic key of the signing authority, such as root token 112*a*, during the trusted manufacture of IHS 100.

In certain embodiments, SPI Flash 110 may also include a region 112*d* including version tokens that may be utilized during runtime to revoke or alter one or more privileges of a privilege policy token. Each version data token in region 112*d* may specify the index of a signing token in region 112*b* and may also specify the current privilege policy token of region 112*c* that is associated with the signing token. In certain embodiments, the embedded controller 107 may monitor for any changes to a version tokens stored in region 112*d*. If any such changes are detected, the signing token associated with the updated version token may be used to determine the affected trust domain and the updated privilege policy token to be used with regard to further operations by the trust domain. In certain embodiments, the contents of region 112*d* may be signed using the cryptographic key of the signing authority, such as root token 112*a*, during the trusted manufacture of IHS 100.

As illustrated, SPI Flash 110 may include one more boot component regions 114*a-n* that may each include instructions, such as compiled binary images, that will operate within a secure execution environment of IHS 100. In certain embodiments, each boot component region 114*a-n* may include instructions for the operation of a trust domain within the secure execution environment of IHS 100. As described in additional detail with regard to FIG. 3, the instructions from each boot component region 114*a-n* of SPI Flash 110 may be validated, based on a signature provided with each region 114*a-n*, as being instructions provided for the trust domain. Once validated as belonging to a trust domain, the instructions from a boot component region 114*a-n* may be allowed to operate within the secure execution environment according to the privileges set forth in the privilege policy token that is linked to the signing key of the trust domain.

In various embodiments, IHS 100 may not include each of the components shown. Additionally, or alternatively, IHS 100 may include components other than those that are shown (e.g., additional storage and user interface devices, Super I/O controllers, USB ports, etc.). Furthermore, some of the components that are represented as separate components may, in some implementations, be integrated with other components. In various embodiments, all or a portion of the functionality provided by the illustrated components may instead be provided by components integrated into processor 101 as a system-on-a-chip (SOC) or the like.

Figure 2:
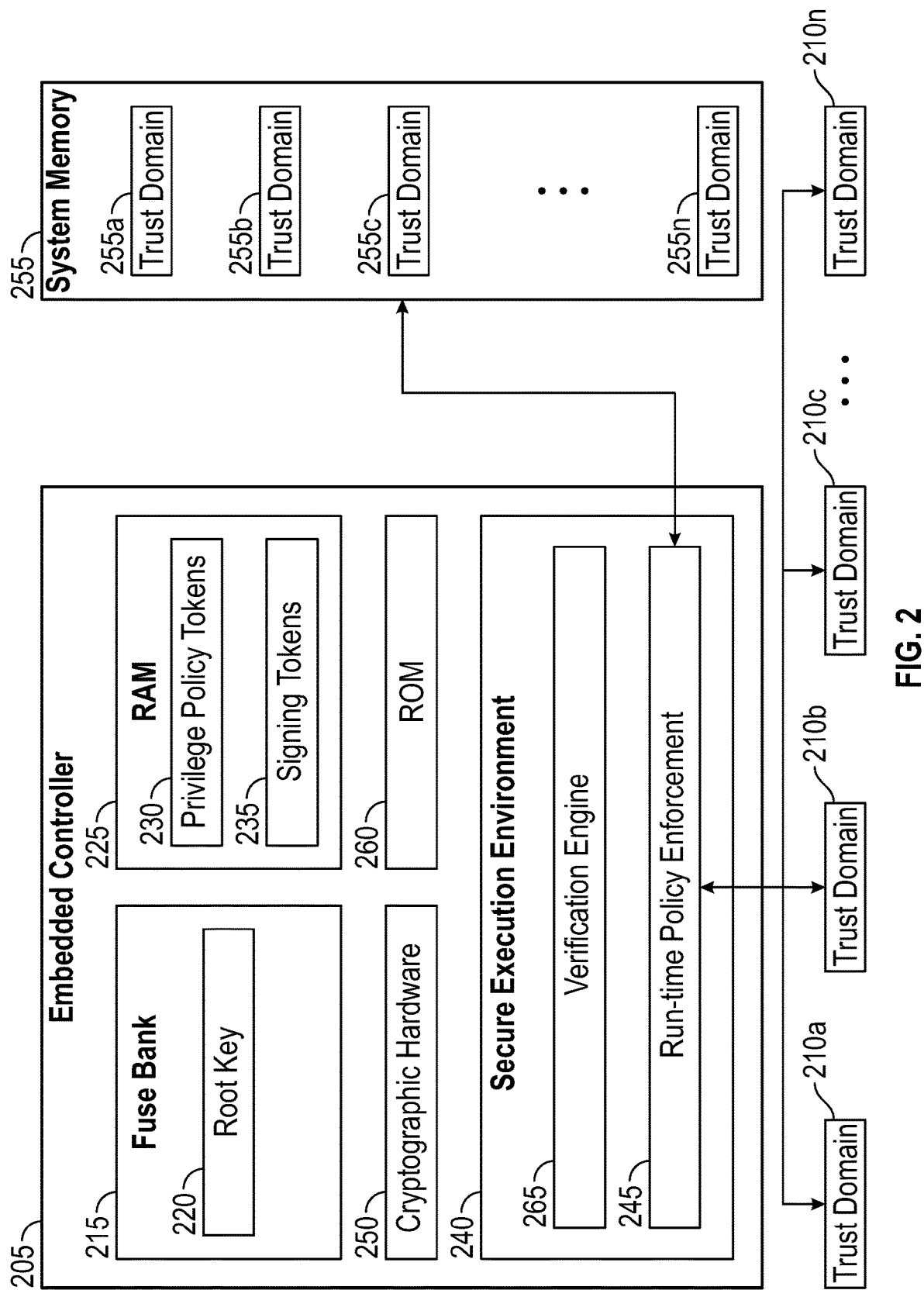
FIG. 2 is a block diagram illustrating an example of components of a system configured, according to some embodiments, for providing isolation of trust domains within a secure execution environment.

FIG. 2 illustrates an example of components of a system 200 configured, according to some embodiments, for providing isolation of trust domains 210*a-n* operating within a within a secure execution environment. In system 200, an embedded controller 205 may be established as a hardware root of trust, such as described with regard to FIG. 1, through the verification of firmware used by the embedded controller 205, where the verification is made using immutable, hard-coded ROM 260 instructions. Once established as the hardware root of trust, the embedded controller 205 may continue to load instruction to RAM 225 to validate the instructions by which a secure execution environment 240 may be initiated. For instance, the embedded controller 205 may include a processor or other logic unit that executes the secure execution environment 240 based on instructions authenticated within the hardware root of trust established by the embedded controller 205.

In certain embodiments, embedded controller 205 may be provisioned during manufacture of the IHS in which embedded controller 205 is installed. Such provisioning may immutably store a root key 220 associated with a trusted signing authority, such as the manufacturer of the IHS, the provider of the chipset used by IHS, or a trusted administrator. In certain embodiments, the embedded controller 205 may be configured, as part of a trusted manufacturing process, to retrieve a root key 220, such as from the root key region of the SPI Flash or directly from the signing authority, as described with regard to FIG. 1. The embedded controller 205 may be configured to encode a retrieved root key by blowing a pattern of fuses within fuse bank 215. Encoded in this manner, the encoded root key 220 cannot be further modified, or at least cannot be modified in a manner that is not readily apparent. In certain embodiments, the fuse bank 215 may also encode one or more additional root keys that may be associated with additional, delegated signing authorities that may be authorized to manage the operation of trust domains 210*a-n* within the secure execution environment.

Upon initialization, embedded controller 205 may utilize root key 220 to establish a root of trust and to initiate a secure execution environment 245 within that root of trust. As described in additional detail with regard to FIG. 3, once the secure execution environment 245 is initiated, embedded controller 205 may be configured to retrieve and locally store signing tokens 235 and privilege policy tokens 230. As described, a SPI Flash of the IHS may store an indexed list of signing tokens, each associated with a trust domain 210*a-n*, and may store an indexed list of privilege policy tokens that may each be linked to a signing key, thus indicating the privileges that have been assigned to a specific trust domain. In certain embodiments, the embedded controller 205 may retrieve and store the signing tokens 235 and privilege policy tokens 230 within local RAM 225 for use in validating the components of trust domains 210a-n for operation within secure execution environment 245.

The secure execution environment 245 may include a verification engine 260 utilized to validate the authenticity of trust domain configurations, such as the keys and tokens retrieved from the SPI Flash. In certain embodiments, the verification engine 260 may utilize a cryptographic hardware module of the embedded controller 205 to perform cryptographic validations using the retrieved keys. As described, embedded controller 205 may retrieve an indexed list of signing tokens from the SPI Flash, where each signing token includes a signing key associated with a trust domain, such as a public key the corresponds to a private key used by the trust domain in signing components of the trust domain. Upon storing of the indexed list of signing tokens to local RAM 225, the verification engine 260 may be configured to utilize the root key 220 to validate the signature included in the list of signing tokens, thus confirming the signing authority as the source of the indexed list of signing tokens.

Verification engine 260 may similarly utilize root key 220 to validate the signature included in the list of privilege policy tokens 230 that is similarly retrieved and stored to local RAM 225 in order to similarly validate the signing authority as the source of the list of privilege policy tokens 230. As described in additional detail with regard to FIG. 3, verification engine 260 may also be similarly utilized to validate the authenticity of instruction utilized by the trust domains 210a-n, such as the boot component instructions retrieved from the SPI Flash.

As illustrated, the secure execution environment 240 may include a run-time policy enforcement interface 245 by which the hardware resources of the embedded controller 205 are accessed, while enforcing privilege policies applicable to the respective trust domains 210a-n. As described with regard to FIG. 1, embedded controller 107 may have access to all or a portion of the system memory 115 of the IHS 100. In supporting isolated execution to trust domains 210a-n within the secure execution environment 240, the run-time policy enforcement interface 245 may individually limit each trust domain's access to only a partition of system memory 255, such as a range of memory addresses in system memory 255. For instance, system memory 255 may include trust domain regions 255a-n, each of which may be allocated for use by a specific trust domain 210a-n authorized for operation within the secure execution environment 240.

In certain embodiments, the run-time policy enforcement interface 245 may be configured to restrict access to each individual system memory region 255a-n to a specific trust domain 210a-n, where such restrictions are based on the policy restrictions specified in a privilege policy token that is linked to the signing token of the respective trust domain 210a-n. As described, privilege policy tokens 230 may be retrieved from a SPI Flash of the IHS and stored in local RAM 225 as part of the initialization of the embedded controller 205. The metadata of an individual privilege policy token may specify resources, capabilities and components that may be accessed by a specific trust domain 210a-n. For instance, a privilege policy token may identify a system memory region 255a-n for use by a trust domain. In certain embodiments a privilege policy token may be linked to a signing key of a trust domain via a designation specified in the metadata of the signing token that includes the signing key of the trust domain. The run-time policy enforcement interface 245 may utilize such privilege policy token information to restrict each trust domain's access to an assigned region of system memory, thus providing each trust domain 210a-n with isolated system memory that is not accessible by other trust domains operating within the secure execution environment 240.

Figure 3:
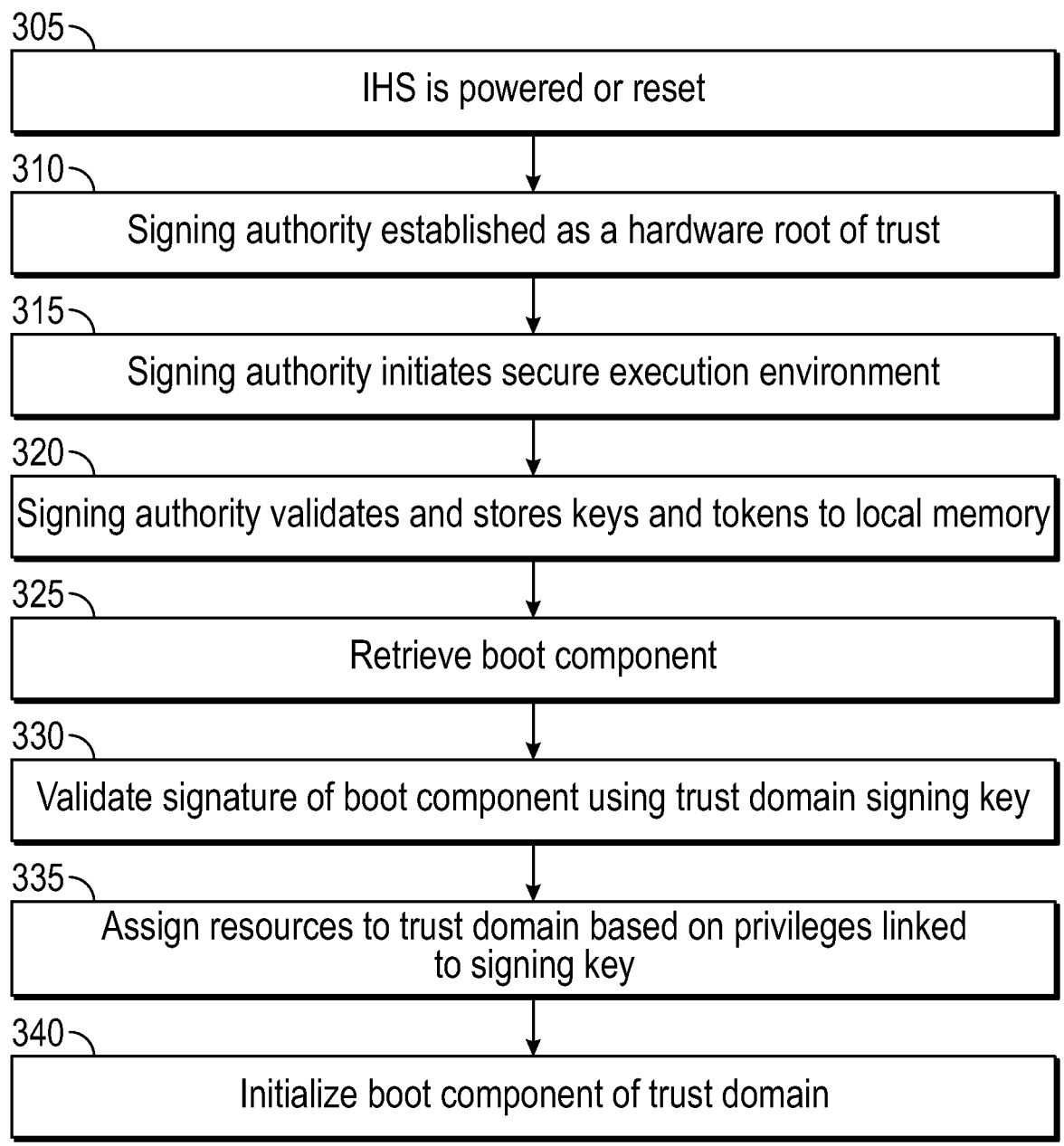
FIG. 3 is flowchart illustrating certain steps of a method according to various embodiments for providing isolation of trust domains within a secure execution environment.

FIG. 3 is flowchart illustrating certain steps of a method according to various embodiments for providing isolation of trust domain operations within a secure execution environment of an IHS. In the embodiment of FIG. 3, an IHS has been configured during a trusted manufacturing process, such as described above, in which cryptographic keys and tokens have been stored to a SPI Flash of the IHS and certain root keys have been encoded within a fuse bank of the component in which a root of trust will be established. The illustrated embodiment begins at block 305, by the powering or reset of the hardware component in which the hardware root of trust is being established, such as the embedded controller of FIGS. 1 and 2. In certain embodiments, upon being initialized, the embedded controller may be configured to pause further booting of the IHS until the embedded controller has been established as the hardware root of trust and the process of FIG. 3 is complete.

At block 310, the embedded controller boots from its own ROM-based boot block, such as from a region of ROM 108 of FIG. 1. The ROM of the embedded controller may be configured with instructions that upon execution, cause the embedded controller to retrieve the embedded controller's firmware instructions from a SPI Flash. The ROM of the embedded controller may be further encoded with instructions for validating the authenticity of the retrieved firmware instructions, such as through use of the root key encoded in the embedded controller fuse bank to verify that the retrieved firmware instructions have been digitally signed by the signing authority.

Once the root of trust has been established in the embedded controller, or other hardware component supported by the signing authority, at block 315, the embedded controller continues to retrieve and validate instructions that support the operation of a secure execution environment. In certain embodiments, the secure execution environment may support the operation of validated processes associated with trust domains. For instance, as described with regard to FIG. 2, digitally signed boot components associated with each trust domain may be retrieved from SPI Flash and validated using the signing key associated with the respective trust domain. The validated instructions may be utilized to initialize the boot component for operation within the secure execution environment.

At block 320, the embedded controller may generate a local copy of the signing and privilege policy tokens for use in supporting the isolation of trust domains within the secure execution environment. By maintaining a local copy of the signing and privilege policy tokens in a local memory, such as a RAM, the embedded controller may support faster and more secure resolution of trust verifications and enforcement actions. At block 325, the embedded controller may retrieve boot component instructions, such as a compiled binary file, from SPI Flash. In certain embodiments, each boot component may be associated with a different trust domain, such that each boot component comprises the instructions necessary for the operation of a trust domain within the secure execution environment. In other embodiments, multiple different boot components may be associated with a single trust domain such that the trust domain may not be fully operational until each of the boot components have been validated.

As described, each boot component may include a digital signature provided by the trust domain that provides and utilizes the boot component. For instance, the boot component signature may be generated using a private key associated with the trust domain providing the boot component. At block 330, the signing key associated with the trust domain may be used to verify the boot component signature as being generated using the private key of the trust domain. In certain embodiments, each boot component may specify an index that corresponds to the index of a signing token within the indexed list of signing tokens retrieved and locally stored by the embedded controller. As described, the signing token of each trust domain includes the signing key associated with the trust domain. Using the index specified by the boot component, the embedded controller identifies the signing key associated with the trust domain providing the boot component. The appropriate signing key may then be used to verify that the signature included with the boot component is authentic such that the boot component is validated as being provided by the trust domain.

At block 335, the embedded controller determines the privileges that are applicable to the trust domain, and consequently to the boot component of the trust domain. As described, the signing token of a trust domain may include metadata that links the signing token to a privilege policy token that specifies a set of privileges. For instance, the signing token metadata may specify an index that corresponds to the index of a privilege policy token within the indexed list of privilege policy tokens retrieved and stored to local memory by the embedded controller. In such embodiments, the embedded controller may access the privilege policy token at the specified index in order to determine the privileges associated with a trust domain. For instance, as described with regard to FIG. 2, a privilege policy token may specify a range of system memory addresses that have been designated for exclusive use by the trust domain that is linked to the privilege policy token.

In various embodiments, the privilege policy token may specify various other capabilities and resources that are available to a trust domain. For instance, a privilege policy token may specify a capability for encoding data within a fuse bank of a trusted component. As described, such a capability may be specified exclusively within a privilege policy token that is linked to the signing key of the signing authority. Such a capability may thus be absent from all other privilege policy tokens, thus limiting this capability to the signing authority. A privilege policy token may specify various other capabilities that may be being utilized by a trust domain. For instance, a privilege policy token may specify capabilities such as support for remote erasing of data, accessing certain information protected through digital rights management and supporting remote collection of telemetry generated by the embedded controller. A privilege policy token may also specify various physical resources that may be accessed by a trust domain. For instance, access a specific fuse bank programmed with a cryptographic key may be limited such that only authorized trust domains may be provided access to read the contents of the programmed fuse bank. Access to other storage resources, such as the SPI Flash coupled to the embedded controller, may also be specified via a privilege policy token. A privilege policy token may also specify access to specific stored data, such as access to certain digital rights management information. Access to specific hardware components, such as sensors and debug ports, may also be specified in a privilege policy token.

At block 340, a boot component may be initialized and begin operation within the secure execution environment. Each individual boot component may operate in isolation from other components through the assignment of resources and capabilities in a manner that segregates the operation of each trust domain. For instance, each trust domain may operate using separate regions of system memory that are specified by a privilege policy token. The embedded controller may continue in this manner until all boot components are operational. In certain embodiments, the embedded controller may continue use of privilege policy token information in enforcing isolation of trust domains during initialization and continued operation of the IHS.

Configured in this manner, the embedded controller may support modification of privileges associated with the trust domain by changing the privilege policy token that is linked to the signing key of that trust domain. By configuring privileges in this manner, the privileges granted to a trust domain may be modified without any inputs or changes from the trust domain and without requiring the overhead of a separate software process for assigning privileges. Using the described embodiments, the privileges assigned to a trust domain may be granted through the validation of the instructions of a trust domain using a signing key that is linked to a privilege policy token. Changing the privilege policy token that is linked to a signing token serves to change the privileges granted to the trust domain associated with the signing token. Accordingly, the validation of a trust domain using a signing key serves to confer privileges that are inherited from the signing key that is used to validate the trust domain. In this manner, the privileges conferred to a trust domain may thus be modified through changes to the privilege policy token that is linked to the signing token of the trust domain.

In addition to supporting modification of trust domain privileges that are inherited from a signing key, embodiments also support isolated operation of the trust domains within the secure execution environment. As described, the privilege policy token that is linked to a signing key may specify resources that have been designed for exclusive use by the trust domain associated with the signing key. For instance, the individual system memory regions of FIG. 2 may be utilized exclusively by a trust domain through the assignment of memory address regions to the trust domain. Various other resources may be similarly designated for exclusive use by a single trust domain. In this manner, each trust domain may operate in isolation without requiring the processing and memory overhead required by techniques that isolate operations through the use of virtual machines, containers, hypervisors and the like. In addition, embodiments provide isolation of resources that are unavailable for allocation in certain virtualization technologies. Software containers, for instance, may provide isolated execution of a process, but do so at the operating-system level, thus precluding certain resource assignments such as exclusive use of a region of system memory.

Isolated operation of trust domains within the secure execution environment may also be supported in certain embodiments through management of additional IHS resources, such as the exclusive assignment of I/O ranges, such as ranges or I/O ports and I/O bus addresses, that may be used exclusively by a specific trust domain to which a range has been assigned. For instance, a request to access a I/O device that is outside of trust domain's assigned range may be denied by the run-time policy enforcement interface, thus limiting access to I/O resources to a single trust domain. In other embodiments, IHS resource management may provide exclusive PCI device access through the assignment of configuration registers for use by specific trust domains. In such embodiments, configuration registers may be designated within the trust domain of a privilege policy token such that the run-time policy enforcement interface may restrict access to the assigned PCI device configuration registers to only the assigned trust domain. Access to various other IHS registers may be similarly managed to provide exclusive access to the registers to a specific trust domain. In a similar manner, other IHS resources, such as buses, may be managed through assignment of bus addresses, for exclusive use by a specific trust domain. In certain embodiments, all access to a specific bus, not just ranges of bus addresses, may be restricted to a single trust domain.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for providing isolation of trust domains within a secure execution environment of a trusted component of an Information Handling System (IHS), the method comprising:

retrieving a plurality of signing software tokens from a memory device of the IHS, wherein each signing software token comprises a signing key and comprises a link to a privilege policy token, and wherein the signing key of each signing software token is associated with a trust domain that is configured to operate in the secure execution environment of the IHS using signed instructions;

retrieving a plurality of privilege policy tokens from the memory device of the IHS, wherein each privilege policy token specifies a plurality of resources of the IHS that is accessed by a trust domain that operates within the secure execution environment of the IHS using signed instructions that have been validated;

retrieving, from the memory device of the IHS, first signed instructions for the operation of a first trust domain within the secure execution environment of the IHS;

validating a signature of the first signed instructions based on a first signing key associated with the first trust domain, wherein the first signing key of the first trust domain is present in the plurality of signing software tokens retrieved from the memory device of the IHS;

in response to determination that the first signed instructions of the first trust domain are validated, granting the first trust domain access to a first plurality of IHS resources specified by a first privilege policy token that is linked to the first signing key associated with the first trust domain;

replacing the link from first signing key to the first privilege policy token with a link to a second privilege policy token specifying a second plurality of IHS resources;

revoking the access by the first trust domain to the first plurality of resources of the IHS specified by the first privilege policy token; and granting the first trust domain access to the second plurality of IHS resources specified by the second privilege token.

2. The method of claim 1, wherein the first plurality of resources granted for access by the first trust domain based on validation of the first signed instructions comprises a first region of a system memory of the IHS.

3. The method of claim 2, further comprising:

receiving a request to access the first region of system memory; and denying the request to access the first region of system memory when the request cannot be validated using the first signing key.

4. The method of claim 1, wherein the first privilege policy token is linked to the first signing key of the first trust domain by a reference to the first privilege policy token in metadata of the first signing token of the first trust domain.

5. The method of claim 1, wherein the plurality of privilege policy tokens retrieved from the memory device are signed by a signing authority, and wherein the plurality of retrieved signing keys are signed by the signing authority.

6. The method of claim 5, further comprising: validating the signature of the plurality of privilege policy tokens and the signature of the plurality of retrieved signing keys using a root key associated with the signing authority.

7. The method of claim 1, wherein the trusted component on which the secure execution environment operates comprises an embedded controller of the IHS.

8. An Information Handling System (IHS), comprising: a flash memory; and an embedded controller coupled to the flash memory, wherein the embedded controller is configured to:

retrieve a plurality of signing software tokens from the flash memory, wherein each signing software token comprises a signing key and comprises a link to a privilege policy token, and wherein the signing, key of each signing software token is associated with a trust domain that is configured to operate in the secure execution environment of the IHS using signed instructions; retrieve a plurality of privilege policy tokens from the flash memory, wherein each privilege policy token specifies a plurality of resources of the IHS that is accessed by a trust domain that operates within the secure execution environment of the IHS using signed instructions that have been validated;

retrieve, from the flash memory, first signed instructions for the operation of a first trust domain within the secure execution environment of the IHS;

validate a signature of the first signed instructions based on a first signing key associated with the first trust domain, wherein the first signing key of the first trust domain is present in the plurality of signing software tokens retrieved from the memory device of the IHS; and in response to determination that the first signed instructions of the first trust domain are validated, grant the first trust domain access to a first plurality of IHS resources specified by a first privilege policy token that is linked to the first signing key associated with the first trust domain, wherein a second privilege policy token is linked to the first signing key in replacement of the link to the first signing key by the first privilege policy token; and wherein the embedded controller is further configured to revoke the access by the first trust domain to the first plurality of resources of the IHS specified by the first privilege policy token and grant the first trust domain access to a second plurality of IHS resources specified by the second privilege policy token.

9. The IHS of claim 8, wherein the first plurality of resources granted for access by the first trust domain based on validation of the first signed instructions comprises a first region of a system memory of the IHS.

10. The IHS of claim 9, wherein the embedded controller is further configured to receive a request to access the first region of system memory and to deny the request to access the first region of system memory when the request cannot be validated using the first signing key.

11. The IHS of claim 8, wherein the first privilege policy token is linked to the first signing key of the first trust domain by a reference to the first privilege policy token in metadata of the first signing token of the first trust domain.

12. The IHS of claim 8, wherein the embedded controller is configured to validate a signature of the plurality of privilege policy tokens and a signature of the plurality of retrieved signing keys using a root key associated with a signing authority.

13. An embedded controller coupled to a flash memory of an Information Handling System (IHS), wherein the embedded controller is configured to:

retrieve a plurality of signing software tokens from the flash memory of the IHS, wherein each signing software token comprises a signing key and comprises a link to a privilege policy token, and wherein the signing, key of each signing software token is associated with a trust domain that is configured to operate in a secure execution environment of the embedded controller using signed instructions;

retrieve a plurality of privilege policy tokens from the flash memory of the IHS, wherein each privilege policy token specifies a plurality of resources of the IHS that is accessed by a trust domain that operates within the secure execution environment of the embedded controller using instructions that have been validated;

retrieve, from the flash memory, first signed instructions for the operation of a first trust domain within the secure execution environment of the embedded controller;

validate a signature of the first signed instructions based on a first signing key associated with the first trust domain, wherein the first signing of the first trust domain is present in the plurality of signing software tokens retrieved from the flash memory of the IHS;

in response to determination that the first signed instructions of the first trust domain are validated, grant the first trust domain access to a first plurality of IHS resources specified by a first privilege policy token that is linked to the first signing key associated with the first trust domain, wherein a second privilege policy token is linked to the first signing key in replacement of the link to the first signing key by the first privilege policy token, and wherein the embedded controller is further configured to revoke the access by the first trust domain to the first plurality of resources of the IHS specified by the first privilege policy token; and grant the first trust domain access to a second plurality of IHS resources specified by the second privilege policy token.

14. The embedded controller of claim 13, wherein the first plurality of resources granted for access by the first trust domain based on validation of the first signed instructions comprises a first region of a system memory of the IHS.

15. The embedded controller of claim 14, further configured to receiving a request to access the first region of system memory and to deny the request to access the first region of system memory when the request cannot be validated using the first signing key.

16. The embedded controller of claim 13, wherein the first privilege policy token is linked to the first signing key of the first trust domain by a reference to the first privilege policy token in metadata of the first signing token of the first trust domain.

17. The embedded controller of claim 13, wherein the embedded controller is configured to validate a signature of the plurality of privilege policy tokens and a signature of the plurality of retrieved signing keys using a root key associated with a signing authority.

* * * * *